United States Patent
Ohori et al.

(10) Patent No.: US 12,351,136 B2
(45) Date of Patent: Jul. 8, 2025

(54) MOTOR CONTROL DEVICE, MOTOR DEVICE, WIPER DEVICE, AND MOTOR CONTROL METHOD

(71) Applicant: MITSUBA Corporation, Gunma (JP)

(72) Inventors: Ryo Ohori, Gunma (JP); Toshiyuki Amagasa, Gunma (JP); Masahiro Yamada, Gunma (JP); Atsushi Mochida, Gunma (JP); Tamotsu Iwazaki, Gunma (JP)

(73) Assignee: MITSUBA Corporation, Gunma (JP)

( * ) Notice: Subject to any disclaimer, the term of this patent is extended or adjusted under 35 U.S.C. 154(b) by 230 days.

(21) Appl. No.: 18/327,880

(22) Filed: Jun. 1, 2023

(65) Prior Publication Data

US 2024/0123943 A1 Apr. 18, 2024

(30) Foreign Application Priority Data

Oct. 14, 2022 (JP) .................... 2022-165419

(51) Int. Cl.
*B60S 1/08* (2006.01)

(52) U.S. Cl.
CPC ........................ *B60S 1/08* (2013.01)

(58) Field of Classification Search
CPC .... G05B 11/28; G05B 2219/42237; G05D 3/18; G05D 3/183; H02P 7/29; B60S 1/08
USPC ................................................ 318/443, 599
See application file for complete search history.

(56) References Cited

U.S. PATENT DOCUMENTS

| | | | |
|---|---|---|---|
| 2016/0079887 A1* | 3/2016 | Takano | H02P 1/028 318/431 |
| 2018/0297179 A1* | 10/2018 | Osada | B25B 21/008 |
| 2019/0315433 A1* | 10/2019 | Hasumi | B62M 6/50 |
| 2020/0259444 A1* | 8/2020 | Aoki | H02P 6/16 |

FOREIGN PATENT DOCUMENTS

JP 2020048401 3/2020

OTHER PUBLICATIONS

Takano et al. (JP 2015009289 A) Electric Tool (Year: 2015).*
Hiruma (JP H1169861 A) Motor Control Device, Freezing Cycle Device and Air Conditioner Using the Motor Control Device (Year: 1999).*
Sasaki et al. (JP H0874588 A) Supercharging Control Method (Year: 1996).*
JP S6364836 A (Year: 1988).*

* cited by examiner

Primary Examiner — Jorge L Carrasquillo
(74) Attorney, Agent, or Firm — JCIPRNET

(57) ABSTRACT

A motor control device includes a driving control part and an upper limit value setting part. The driving control part controls motor driving by switching between a first driving mode and a second driving mode, and controls an output duty ratio so as not to exceed a duty ratio upper limit value. The upper limit value setting part sets, as the duty ratio upper limit value, a low rotation duty ratio upper limit value, a maximum duty ratio upper limit value corresponding to a maximum output value, and an upper limit value of a transition period from the low rotation duty ratio upper limit value to the maximum duty ratio upper limit value, and changes slope information indicating a change amount in the upper limit value of the transition period according to the driving mode when switching between the first driving mode and the second driving mode.

9 Claims, 14 Drawing Sheets

FIG. 3

| Switching element | | Stage 1 | | | Stage 2 | | | Stage 3 | | | Stage 4 | | | Stage 5 | | | Stage 6 | | |
|---|---|---|---|---|---|---|---|---|---|---|---|---|---|---|---|---|---|---|---|
| | | A' | B' | C' | A' | B' | C' | A' | B' | C' | A' | B' | C' | A' | B' | C' | A' | B' | C' |
| U | H | 1 | 1 | 0 | 0 | P | P | P | P | P | P | P | P | 0 | 1 | 1 | 1 | 1 | 0 |
| U | L | 0 | 0 | 0 | 0 | P | P | P | P | P | P | P | P | 0 | 0 | 0 | 0 | 0 | 0 |
| V | H | P | P | P | P | P | 0 | 0 | 1 | 1 | 1 | 1 | 1 | 1 | 1 | 0 | 0 | P | P |
| V | L | P | P | P | P | P | 0 | 0 | 0 | 0 | 0 | 0 | 0 | 0 | 0 | 0 | 0 | P | P |
| W | H | 0 | 1 | 1 | 1 | 1 | 1 | 1 | 1 | 0 | 0 | P | P | P | P | P | P | P | 0 |
| W | L | 0 | 0 | 0 | 0 | 0 | 0 | 0 | 0 | 0 | 0 | P | P | P | P | P | P | P | 0 |

| Switching element | | Stage | | | | | | | | | | | | | | | | | | |
|---|---|---|---|---|---|---|---|---|---|---|---|---|---|---|---|---|---|---|---|---|
| | | 1 | | | 2 | | | 3 | | | 4 | | | 5 | | | 6 | | |
| | | A | B | C | A | B | C | A | B | C | A | B | C | A | B | C | A | B | C |
| U | H | PL | PL | PM | PM | PS | PS | PS | PS | PS | PS | PS | PM | PM | PL | PL | PL | PL | PL |
| | L | PL | PL | PM | PM | PS | PS | PS | PS | PS | PS | PS | PM | PM | PL | PL | PL | PL | PL |
| V | H | PS | PS | PS | PS | PS | PM | PM | PL | PL | PL | PL | PL | PL | PL | PL | PM | PS | PS |
| | L | PS | PS | PS | PS | PS | PM | PM | PL | PL | PL | PL | PL | PL | PL | PL | PM | PS | PS |
| W | H | PM | PL | PL | PL | PL | PL | PL | PL | PL | PM | PS | PS | PS | PS | PS | PS | PS | PM |
| | L | PM | PL | PL | PL | PL | PL | PL | PL | PL | PM | PS | PS | PS | PS | PS | PS | PS | PM |

| Switching element | | Stage 1 | | | Stage 2 | | | Stage 3 | | | Stage 4 | | | Stage 5 | | | Stage 6 | | |
|---|---|---|---|---|---|---|---|---|---|---|---|---|---|---|---|---|---|---|---|
| | | A″ | B″ | C″ | A″ | B″ | C″ | A″ | B″ | C″ | A″ | B″ | C″ | A″ | B″ | C″ | A″ | B″ | C″ |
| U | H | 1 | 1 | P2 | P2 | P1 | P1 | P1 | P1 | P1 | P1 | P1 | P2 | P2 | 1 | 1 | 1 | 1 | 1 |
| U | L | 0 | 0 | P2 | P2 | P1 | P1 | P1 | P1 | P1 | P1 | P1 | P2 | P2 | 0 | 0 | 0 | 0 | 0 |
| V | H | P1 | P1 | P1 | P1 | P1 | P2 | P2 | 1 | 1 | 1 | 1 | 1 | 1 | 1 | P2 | P2 | P1 | P1 |
| V | L | P1 | P1 | P1 | P1 | P1 | P2 | P2 | 0 | 0 | 0 | 0 | 0 | 0 | 0 | P2 | P2 | P1 | P1 |
| W | H | P2 | 1 | 1 | 1 | 1 | 1 | 1 | 1 | P2 | P2 | P1 | P1 | P1 | P1 | P1 | P1 | P1 | P2 |
| W | L | P2 | 0 | 0 | 0 | 0 | 0 | 0 | 0 | P2 | P2 | P1 | P1 | P1 | P1 | P1 | P1 | P1 | P2 |

MOTOR CONTROL DEVICE, MOTOR DEVICE, WIPER DEVICE, AND MOTOR CONTROL METHOD

CROSS-REFERENCE TO RELATED APPLICATION

This application claims the priority benefit of Japan application serial no. 2022-165419, filed on Oct. 14, 2022. The entirety of the above-mentioned patent application is hereby incorporated by reference herein and made a part of this specification.

BACKGROUND

Technical Field

The disclosure relates to a motor control device, a motor device, a wiper device, and a motor control method.

Related Art

In recent years, in motor control, motor control devices that switch between different driving modes, such as a non-free driving mode and a rectangular wave driving mode, according to a load magnitude have been known (e.g., see Patent Document 1: Japanese Patent Application Laid-Open No. 2020-48401). Herein, the non-free driving mode is a driving mode that outputs one half of the duty in the OFF phase (corresponding to a phase open period, hereinafter also referred to as a free phase) among three phases, and the non-free driving mode is a low-output driving mode in which the number of revolutions decreases compared to the rectangular wave driving mode in the case of driving at the same power.

In the motor control device as described above, a protection function is provided to restrict an output duty of the motor according to the number of revolutions of the motor to prevent an overcurrent in the case where a load is applied and the number of revolutions (rotational speed) of the motor decreases during operation of the motor, for example. However, in the conventional motor control device, a common upper limit value (duty limit value) of the output duty ratio is set according to the characteristics of one of the two driving modes having different motor driving characteristics to protect the motor. Thus, in the conventional motor control device, depending on the driving mode, excessive restriction is imposed, and sufficient output performance cannot be obtained.

SUMMARY

An aspect of the disclosure is a motor control device which controls a motor having an output shaft. The motor control device includes a driving control part and an upper limit value setting part. The driving control part controls motor driving by switching between a first driving mode which drives the motor and a second driving mode in which a number of revolutions of the output shaft and an output of the motor are higher than in the first driving mode, and controls an output duty ratio indicating a driving output of the motor so as not to exceed a duty ratio upper limit value. The upper limit value setting part sets, as the duty ratio upper limit value, a low rotation duty ratio upper limit value which restricts a maximum value of the output duty ratio in a low rotation region in which a rotational speed is equal to or less than a predetermined rotation threshold, a maximum duty ratio upper limit value corresponding to a maximum output value of the driving output, and an upper limit value of a transition period from the low rotation duty ratio upper limit value to the maximum duty ratio upper limit value in a high rotation region exceeding the rotation threshold, and changes slope information indicating a change amount in the upper limit value of the transition period with respect to a change in the rotational speed according to the driving mode when switching between the first driving mode and the second driving mode.

Furthermore, an aspect of the disclosure is a motor control method which controls a motor having an output shaft. The motor control method includes steps below. In a driving control step, a driving control part controls motor driving by switching between a first driving mode which drives the motor and a second driving mode in which a number of revolutions of the output shaft and an output of the motor are higher than in the first driving mode, and controls an output duty ratio indicating a driving output of the motor so as not to exceed a duty ratio upper limit value. In an upper limit value setting step, an upper limit value setting part sets, as the duty ratio upper limit value, a low rotation duty ratio upper limit value which restricts a maximum value of the output duty ratio in a low rotation region in which a rotational speed is equal to or less than a predetermined rotation threshold, a maximum duty ratio upper limit value corresponding to a maximum output value of the driving output, and an upper limit value of a transition period from the low rotation duty ratio upper limit value to the maximum duty ratio upper limit value in a high rotation region exceeding the rotation threshold, and changes slope information indicating a change amount in the upper limit value of the transition period with respect to a change in the rotational speed according to the driving mode when switching between the first driving mode and the second driving mode.

According to the disclosure, it is possible to obtain sufficient output performance according to the driving mode while safely protecting the motor device.

BRIEF DESCRIPTION OF THE DRAWINGS

FIG. 3 is a table summarizing an example of the rectangular wave driving patterns in this embodiment.

FIG. 5 is a table summarizing the first example of the non-free driving patterns in this embodiment.

FIG. 7 is a table summarizing a second example of the non-free driving patterns in this embodiment.

DESCRIPTION OF THE EMBODIMENTS

Embodiments of the disclosure provide a motor control device, a motor device, a wiper device, and a motor control method capable of obtaining sufficient output performance according to a driving mode while safely protecting the motor device.

Hereinafter, a motor control device, a motor device, a wiper device, and a motor control method according to an embodiment of the disclosure will be described with reference to the drawings.

Figure 1:
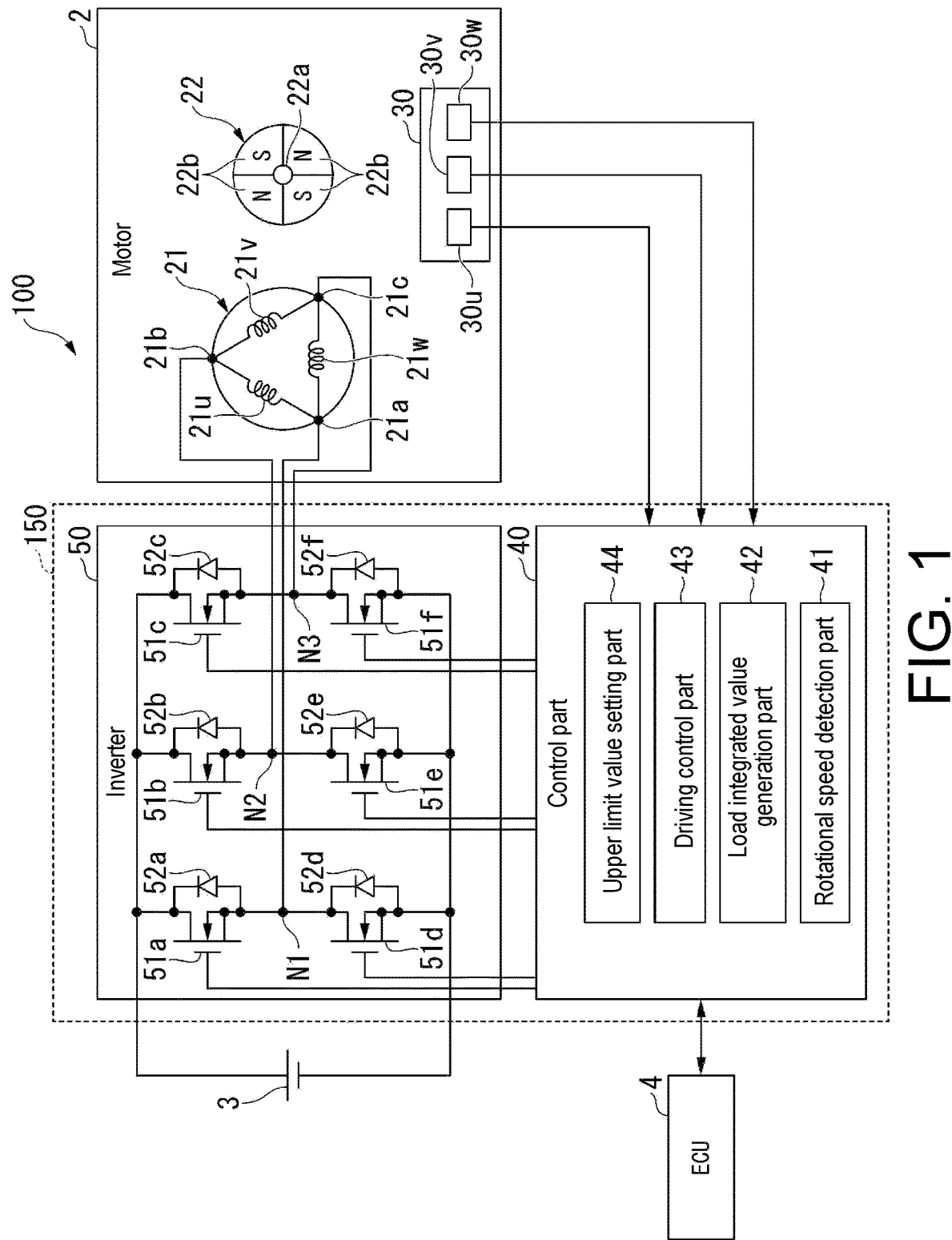
FIG. 1 is a block diagram showing an example of a motor device according to this embodiment.

FIG. 1 is a block diagram showing an example of a motor device 100 according to this embodiment. As shown in FIG. 1, the motor device 100 includes a motor 2, a control part 40, and an inverter 50. The motor device 100 according to this embodiment is, for example, used in a wiper device that wipes a window glass of a vehicle.

In this embodiment, the control part 40 and the inverter 50 are compatible with a motor control device 150. Further, a battery 3 and an engine control unit (ECU) 4 are connected to the motor control device 150.

The motor 2 is, for example, a three-phase four-pole brushless motor. The motor 2 rotates and drives according to an output signal (applied voltage) outputted by the inverter 50 based on a driving signal to be described later. Further, the motor 2 includes a stator 21 and a rotor 22.

The stator 21 is fixed to an inner circumference of a case of the motor 2. The stator 21 includes windings (21u, 21v, 21w) of three phases. The stator 21 is wound with the windings (21u, 21v, 21w). For example, the windings (21u, 21v, 21w) of three phases are connected in a delta connection configuration.

In the delta connection configuration, the winding 21u and the winding 21w are connected by a connection point 21a, the winding 21v and the winding 21w are connected by a connection point 21c, and the winding 21u and the winding 21v are connected by a connection point 21b.

The rotor 22 is provided on the inner side of the stator 21. The rotor 22 includes, for example, a rotor shaft 22a and a four-pole permanent magnet 22b attached to the rotor shaft 22a. A plurality of bearings (not shown) are provided in the case of the motor 2, and the rotor shaft 22a is rotatably supported by the plurality of bearings.

A position detection part 30 detects a signal corresponding to rotation of the rotor 22. The position detection part 30 includes, for example, three Hall elements (30u, 30v, 30w). Upon rotation of the rotor 22, the three Hall elements (30u, 30v, 30w) output pulse signals, which are 120 degrees phase-shifted with respect to each other, to the control part 40. That is, the position detection part 30 generates pulse signals based on changes in the magnetic pole of a sensor magnet (not shown) arranged at the rotor shaft 22a as the rotor 22 rotates, and outputs the pulse signals to the control part 40. Each of the Hall element (30u, 30v, 30w) detects a position shifted by 120 degrees in electrical angle.

In this embodiment, the Hall element 30u outputs a digital signal (position detection signal Hu) corresponding to the U-phase, the Hall element 30v outputs a digital signal (position detection signal Hv) corresponding to the V-phase, and the Hall element 30w outputs a digital signal (position detection signal Hw) corresponding to the W-phase. In this embodiment, the three Hall elements (30u, 30v, 30w) are arranged with respect to the rotor 22 in such a manner that an advance angle of 30 degrees in electrical angle is obtained in the case where the output of the inverter 50 is changed immediately at each position at which the level of the output signal of the three Hall elements (30u, 30v, 30w) changes, i.e., at each position at which an edge occurs in the output signal.

Based on a driving signal generated by the driving control part 43 (to be described later), the inverter 50 is subjected to, for example, pulse width modulation (PWM) control and applies a voltage to the windings (21u, 21v, 21w) of three phases of the motor 2. That is, based on the driving signal generated by the driving control part 43, the inverter 50 causes switching elements (51a to 51f) to perform a switching operation (conduction/non-conduction) to change an output magnitude (duty ratio), an energization period (energization angle), and an energization timing (advance angle) of the voltage applied to the motor 2. Herein, the duty ratio represents a ratio of a conduction period of the corresponding switching element in a PWM cycle.

The inverter 50 generates an applied voltage with a direct current power supplied from the battery 3. The battery 3 is, for example, a direct current power supply such as a lead-acid battery or a lithium-ion battery and supplies power that drives the motor 2.

The inverter 50 includes six switching elements 51a to 51f connected in a three-phase bridge, and diodes 52a to 52f. The switching elements 51a to 51f are, for example, N-channel metal oxide semiconductor field effect transistors (MOSFET) and constitute a three-phase bridge circuit.

The switching element 51a and the switching element 51d are connected in series between a positive electrode terminal and a negative electrode terminal of the battery 3 and constitute a U-phase bridge circuit. The switching element 51a has a drain terminal connected to the positive electrode terminal of the battery 3, a source terminal connected to a node N1, and a gate terminal connected to a signal line of an upper-side driving signal of the U-phase. Further, the switching element 51d has a drain terminal connected to the node N1, a source terminal connected to the negative electrode terminal of the battery 3, and a gate terminal connected to a signal line of a lower-side driving signal of the U-phase. Further, the node N1 is connected to the connection point 21a of the motor 2.

The switching element 51b and the switching element 51e are connected in series between the positive electrode terminal and the negative electrode terminal of the battery 3 and constitute a V-phase bridge circuit. The switching element 51b has a drain terminal connected to the positive electrode terminal of the battery 3, a source terminal connected to a node N2, and a gate terminal connected to a signal line of an upper-side driving signal of the V-phase. Further, the switching element 51e has a drain terminal connected to the node N2, a source terminal connected to the negative electrode terminal of the battery 3, and a gate terminal connected to a signal line of a lower-side driving signal of the V-phase. Further, the node N2 is connected to the connection point 21b of the motor 2.

The switching element 51c and the switching element 51f are connected in series between the positive electrode terminal and the negative electrode terminal of the battery 3 and constitute a W-phase bridge circuit. The switching element 51c has a drain terminal connected to the positive electrode terminal of the battery 3, a source terminal connected to a node N3, and a gate terminal connected to a signal line of an upper-side driving signal of the W-phase. Further, the switching element 51f has a drain terminal connected to the node N3, a source terminal connected to the negative electrode terminal of the battery 3, and a gate terminal connected to a signal line of a lower-side driving signal of the W-phase. Further, the node N3 is connected to the connection point 21c of the motor 2.

Further, the diode 52a has an anode terminal connected to the node N1 and a cathode terminal connected to the positive electrode terminal of the battery 3. Further, the diode 52d has an anode terminal connected to the negative electrode terminal of the battery 3 and a cathode terminal connected to the node N1.

Further, the diode 52b has an anode terminal connected to the node N2 and a cathode terminal connected to the positive electrode terminal of the battery 3. Further, the diode 52e has an anode terminal connected to the negative electrode terminal of the battery 3 and a cathode terminal connected to the node N2.

Further, the diode 52c has an anode terminal connected to the node N3 and a cathode terminal connected to the positive electrode terminal of the battery 3. Further, the diode 52f has an anode terminal connected to the negative electrode terminal of the battery 3 and a cathode terminal connected to the node N3.

The control part 40 is, for example, a processor including a central processing unit (CPU) and comprehensively controls the motor device 100. The control part 40 generates a driving signal corresponding to a target rotation output (e.g., target number of revolutions TRPM) of the rotor 22 and outputs the generated driving signal to the inverter 50. The control part 40 transmits and receives predetermined information to and from the ECU 4 and the motor 2. Further, the control part 40 includes a rotational speed detection part 41, a load integrated value generation part 42, a driving control part 43, and an upper limit value setting part 44.

The rotational speed detection part 41 detects a rotational speed (number of revolutions) of the motor 2 (rotor 22). The rotational speed detection part 41, for example, detects the rotational speed based on the position detection signals (Hu, Hv, Hw) outputted by the position detection part 30.

The load integrated value generation part 42 executes a high load detection process of the rotor 22 based on a set rotational speed of the rotor 22 and a duty ratio. The load integrated value generation part 42 calculates and accumulates a load point value from the motor speed (rotational speed of the rotor 22) and the duty ratio, and generates an accumulated point value (load integrated value). The rotational speed of the rotor 22 is detected by the rotational speed detection part 41 based on the output signals of the three Hall elements (30u, 30v, 30w).

For example, referring to a load point map (not shown) that associates a motor speed, a duty ratio, and a power supply voltage with a load point value, the load integrated value generation part 42 acquires the load point value corresponding to the motor speed, the duty ratio, and the power supply voltage. The load integrated value generation part 42 integrates the acquired load point values and generates an accumulated point value as a load integrated value.

As a high load state continues, since the "+" (positive) load point value continues, the accumulated point value (load integrated value) becomes a large positive value. On the other hand, as a normal load or a light load state continues, since the "0" or "−" (negative) load point value continues, the accumulated point value becomes "0" or less. Herein, the accumulated point value is all set to "0" in the case of "0" or less, and the accumulated point value indicates "0" when the motor 2 is operating normally. Further, once in the high load state, in the case where the load is subsequently reduced to a controllable region, the accumulated load point value is gradually subtracted and eventually converges to "0" or a small positive value. Thus, by looking at the accumulated point value, it is possible to learn the current status of the motor 2 and determine it as a high load in the case where the value exceeds a specific level. In this manner, the accumulated point value (load integrated value) serves as an index value of the load on the motor 2, and the control part 40 uses the accumulated point value (load integrated value) in the control on motor driving.

The driving control part 43 generates a driving signal corresponding to a target rotation output (e.g., target number of revolutions TRPM) of the rotor 22 and outputs the generated driving signal to the inverter 50. The driving control part 43, for example, switches between a rectangular wave driving mode (an example of a second driving mode) and a non-free driving mode (an example of a first driving mode) based on the accumulated point value (load integrated value) to control driving of the motor 2. The rectangular wave driving mode is a high-output driving mode in which a minimum rotational speed at which the rotor shaft 22a can be rotationally driven by the inputted power is higher than that in the non-free driving mode. Herein, referring to FIG. 2 to FIG. 7, details of the rectangular wave driving mode and the non-free driving mode will be described.

Figure 2:
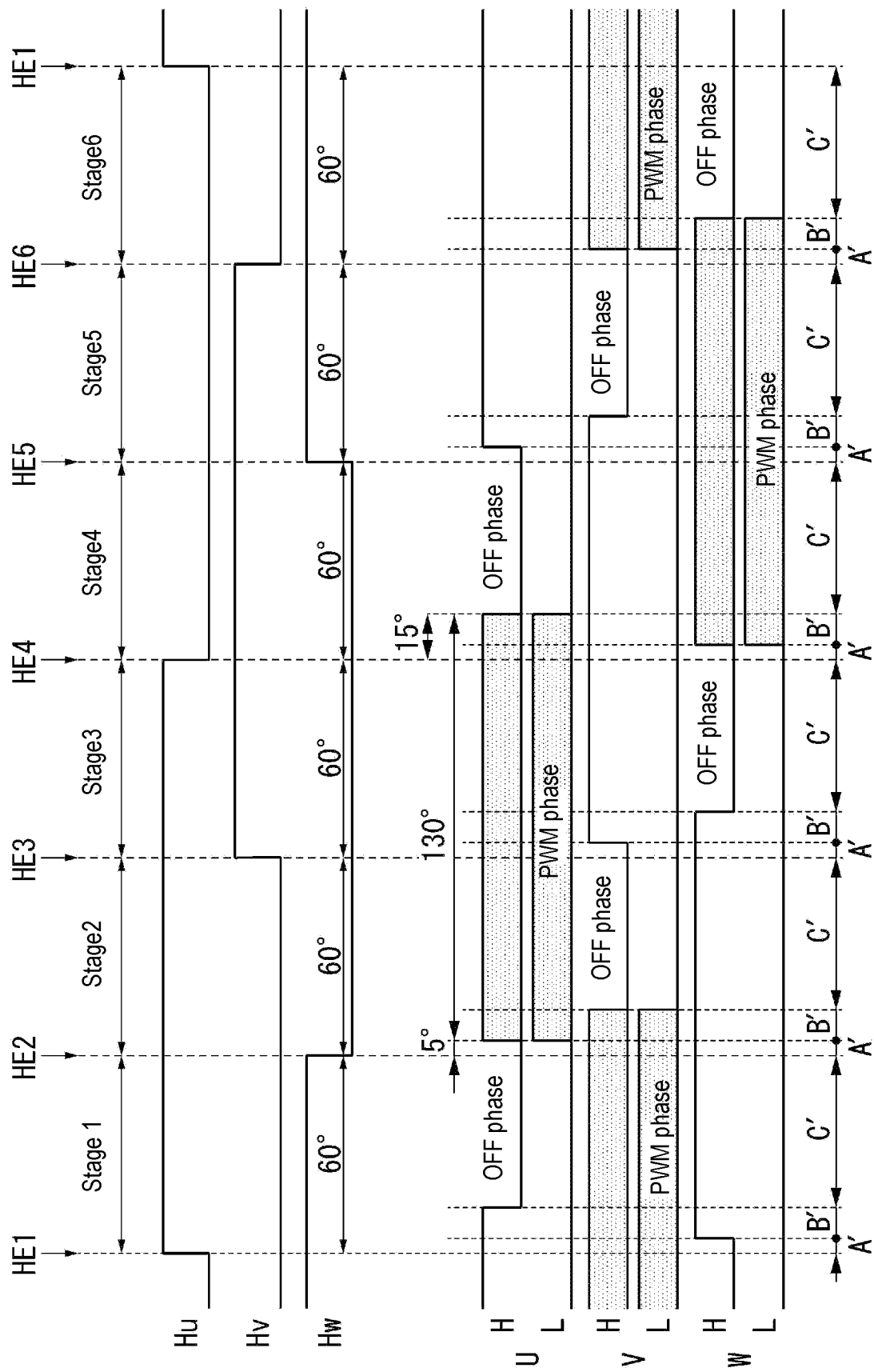
FIG. 2 is a diagram showing an example of rectangular wave driving patterns in this embodiment.
Figure 4:
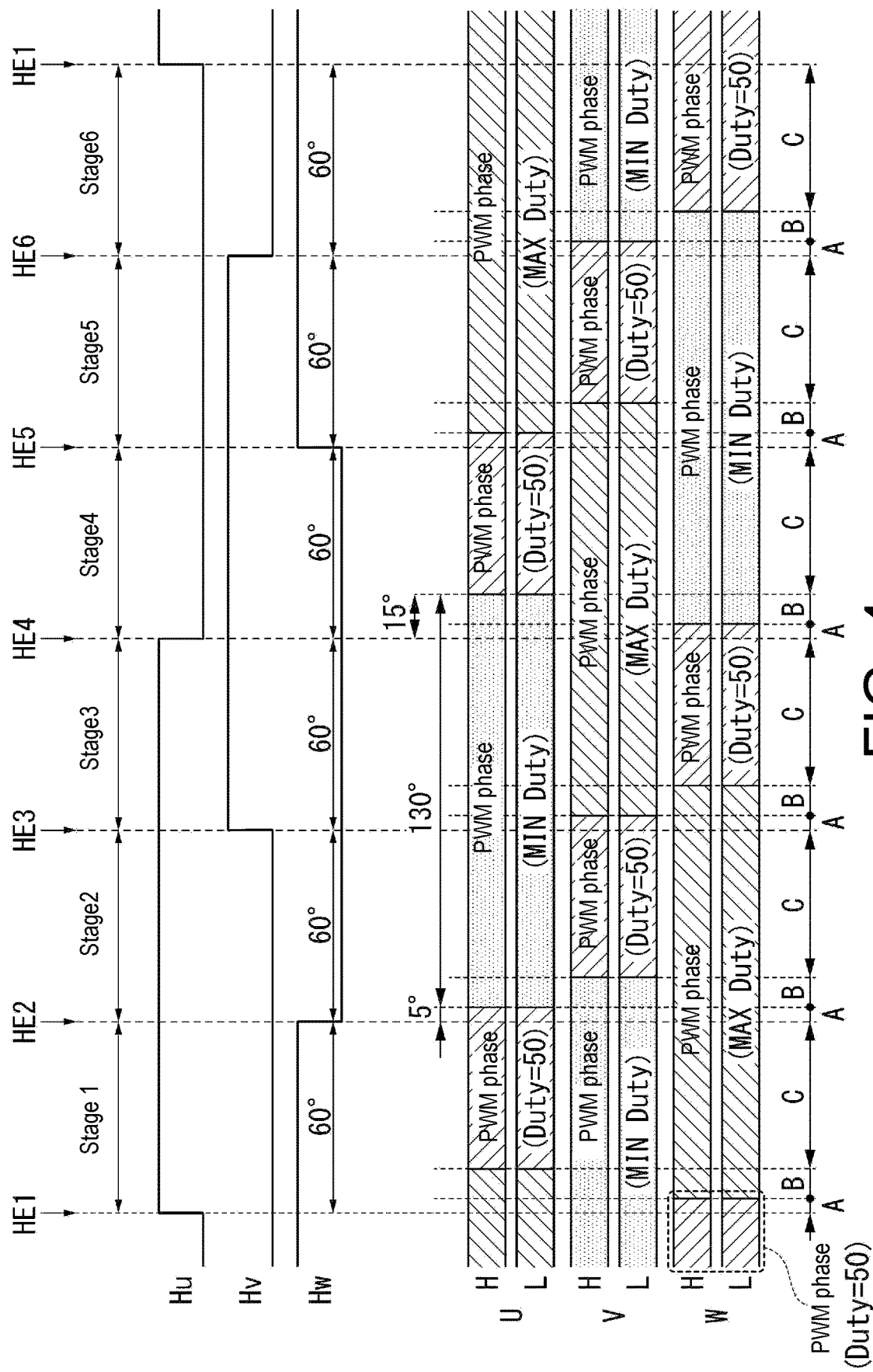
FIG. 4 is a diagram showing a first example of non-free driving patterns in this embodiment.
Figure 6:
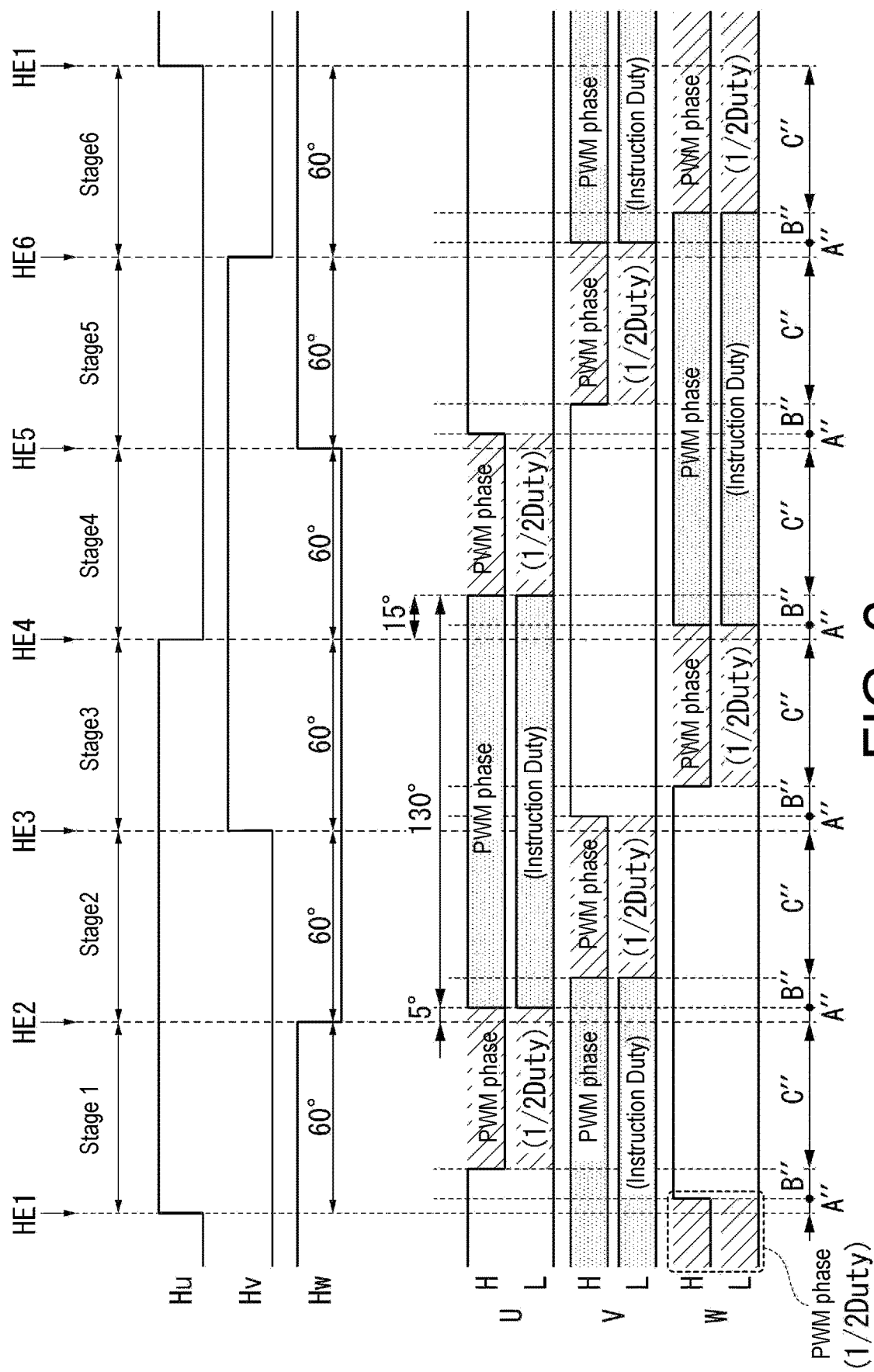
FIG. 6 is a diagram showing a second example of the non-free driving patterns in this embodiment.

FIG. 2, FIG. 4, and FIG. 6 are diagrams for illustrating an example of the position detection signals (Hu, Hv, Hw) outputted by the Hall elements (30u, 30v, 30w) and advance angles and energization angles in energization control of the inverter 50. FIG. 2, FIG. 4, and FIG. 6 show the correspondence between the position detection signals (Hu, Hv, Hw) and angular regions in which the switching elements 51a to 51f are turned on. The horizontal axis represents the rotational position of the magnetic pole of the rotor 22 of the motor 2 in electrical angle.

The position detection signals (Hu, Hv, Hw) have a phase difference of 120 degrees from each other with an electrical angle of 360 degrees being one cycle, and change to an H state (high state) or an L state (low state) every 180 degrees. In this embodiment, the change of the position detection signal Hu from the L state to the H state is referred to as a Hall edge HE1, and the change from the H state to the L state is referred to as a Hall edge HE4. Further, the change of the position detection signal Hv from the L state to the H state is referred to as a Hall edge HE3, and the change from the H state to the L state is referred to as a Hall edge HE6. Further, the change of the position detection signal Hw from the L state to the H state is referred to as a Hall edge HE5, and the change from the H state to the L state is referred to as a Hall edge HE2.

Assuming that the position detection signals (Hu, Hv, Hw) outputted by the Hall elements (30u, 30v, 30w) do not contain errors, the electrical angle between the respective Hall edges is 60 degrees. Further, the region between the Hall edge HE1 and the Hall edge HE2 is referred to as a Hall stage 1 (hereinafter simply referred to as a stage 1 (the same applies hereinafter)), the region between the Hall edge HE2 and the Hall edge HE3 is referred to as a stage 2, and the region between the Hall edge HE3 and the Hall edge HE4 is referred to as a stage 3. Further, the region between the Hall edge HE4 and the Hall edge HE5 is referred to as a stage 4, the region between the Hall edge HE5 and the Hall edge HE6 is referred to as a stage 5, and the region between the Hall edge HE6 and the Hall edge HE1 is referred to as a stage 6.

FIG. 2 is a diagram showing an example of rectangular wave driving patterns in this embodiment. FIG. 2 is a diagram showing the correspondence between the position detection signals (Hu, Hv, Hw) and energization patterns of the respective switching element 51a to 51f, with the horizontal axis representing the electrical angle. The example of energization control shown in FIG. 2 is the case where the advance angle is 20 degrees and the energization angle is 130 degrees.

The energization pattern is a combination of any of states of the respective switching element 51a to 51f, including a state of being continuously turned on ("ON"), a state of being continuously turned off ("OFF") (period other than "ON" or "PWM", also referred to as a free phase period), and a state of being controlled to be turned on or off at a specific cycle (PWM-controlled state) ("PWM"). Each of the stages 1 to 6 is further divided into three sections including a section A', a section B', and a section C'. An energization pattern is set individually for each of the section A', the section B', and the section C'. The period (electrical angle) of each of the section A', the section B', and the section C' changes according to the value of the advance angle and the value of the energization angle.

For example, in the stage 1 defined between the Hall edge HE1 and the Hall edge HE2, the energization pattern of the section A' is a combination of the states of the switching elements 51a to 51f being "ON", "OFF", "PWM", "PWM", "OFF", and "OFF", respectively. Further, the energization pattern of the section B' is a combination of the states of the switching elements 51a to 51f being "ON", "OFF", "PWM", "PWM", "ON", and "OFF", respectively. Further, the energization pattern of the section C' is a combination of the states of the switching elements 51a to 51f being "OFF", "OFF", "PWM", "PWM", "ON", and "OFF", respectively.

Further, FIG. 3 is a table summarizing an example of the rectangular wave energization patterns in this embodiment shown in FIG. 2. A ROM (not shown) in the control part 40, for example, stores the rectangular wave energization patterns in a format as shown in FIG. 3. In FIG. 3, "1" represents "ON", "0" represents "OFF", and "P" represents "PWM".

As described above, the combination defining the rectangular wave energization pattern includes three states (1) to (3) below.

(1) First state: The switching element 51a to 51f is continuously turned on ("ON").

(2) Second state: The switching element 51a to 51f is continuously turned off ("OFF") (period other than "ON" or "PWM").

(3) Third state: The switching element 51a to 51f is controlled to be turned on or off at a specific cycle (PWM-controlled state) ("PWM").

Thus, in the rectangular wave driving mode, the driving control part 43 controls conduction (energization) of the switching elements 51a to 51f according to the rectangular wave energization patterns above.

Next, referring to FIG. 4 to FIG. 7, the non-free driving mode will be described. There are two methods for controlling a non-free energization pattern used in the non-free driving mode.

In a first method of non-free energization, a duty ratio of a PWM signal for the switching element connected to a coil of one phase among the three phases is set to an intermediate value between duty ratios of respective PWM signals for the switching elements connected to coils of the other two phases.

In a second method of non-free energization, the duty ratio of the PWM signal for the switching element connected to the coil of one phase among the three phases is set to one half of an instruction duty ratio inputted from outside, and the duty ratios of the respective PWM signals for the switching elements connected to the coils of the other two phases are respectively set to the same value as the instruction duty ratio and 100%.

First Method of Non-Free Energization

In the driving and energization based on the non-free energization pattern using the first method, the states (1) to (3) above are respectively changed to three states (4) to (6) below.

(4) Fourth state: The first state is changed to a fourth state (hereinafter referred to as a "PL" state) in which PWM control is performed according to a PWM signal with a maximum duty ratio greater than that in the PWM control in the third state.

(5) Fifth state: The third state is changed to a fifth state (hereinafter referred to as a "PS" state) in which PWM control is performed according to a PWM signal with a minimum duty ratio smaller than that in the PWM control in the third state.

(6) Sixth state: The second state is changed to a sixth state (hereinafter referred to as a "PM" state) in which PWM control is performed according to a PWM signal with an intermediate duty ratio between the maximum duty ratio and the minimum duty ratio.

In other words, the timings at which the U-phase, V-phase, and W-phase windings (21u, 21v, 21w) respectively become the PM state (sixth state) in the non-free energization pattern are the same as the timings at which the U-phase, V-phase, and W-phase windings (21u, 21v, 21w) respectively become OFF-phase coils (second state) in the rectangular wave energization pattern.

Thus, it is possible to address the problem that the control circuit (driving control part 43) that drives the switching elements 51a to 51f malfunctions when a negative voltage is generated at an input terminal of the motor 2 upon switching of the energization pattern from the first state to the second state. Further, even at the timing (phase open period: period of being in the second state) of being free in 120-degree rectangular wave energization, PWM control is performed as in the sixth state, which results in 180-degree energization and a smooth current waveform at the time of commutation, so it becomes possible to expect an effect of quieting a driving sound (reducing motor operation sound).

Herein, in this embodiment, the intermediate duty ratio is 50%. Further, the maximum duty ratio is a duty ratio obtained by adding one half of the instruction duty ratio inputted from outside to the intermediate duty ratio. Further, the minimum duty ratio is a duty ratio obtained by subtracting one half of the instruction duty ratio from the intermediate duty ratio.

For example, in the case where the instruction duty ratio is 80%, since the intermediate duty ratio is preset to 50%, the maximum duty ratio becomes 90% according to (50+80÷2), and the minimum duty ratio becomes 10% according to (50−80÷2). The instruction duty ratio is assumed to be stored in advance to the ROM (not shown) of the control part 40 by a user.

Herein, the switching elements 51d to 51f on the negative electrode side receive PWM signals that are in reverse phase to the PWM signals inputted to the switching elements 51a to 51c on the positive electrode side. Thus, the duty ratios of PWM signals that drive a pair of switching elements on the positive electrode side and the negative electrode side differ from each other. However, in this embodiment, the duty ratios of PWM signals that drive the switching elements 51a to 51c on the positive electrode side are referred to as the duty ratios of PWM signals that drive the pairs of switching elements.

FIG. 4 is a diagram showing an example of non-free energization patterns of the first method. FIG. 4 is a diagram showing the correspondence between the position detection signals (Hu, Hv, Hw) and the energization patterns of the respective switching elements 51a to 51f, with the horizontal axis representing the electrical angle.

The example of energization control shown in FIG. 4 is the case where the advance angle is 20 degrees and the energization angle is 130 degrees. The energization pattern is a combination of any of states of the respective switching element 51a to 51f, including a state changed from being continuously turned on ("ON"), i.e., "ON" (first state), to "PL" (fourth state), a state changed from being continuously turned off ("OFF") (period other than "ON" or "PWM"), i.e., "OFF" (second state), to "PM" (sixth state), and a state changed from being controlled to be turned on or off at a specific cycle (PWM-controlled state) ("PWM"), i.e., "PWM" (third state), to "PS" (fifth state).

Each of the stages 1 to 6 is further divided into three sections including a section A, a section B, and a section C. An energization pattern is set individually for each of the section A, the section B, and the section C. The period (electrical angle) of each of the section A, the section B, and the section C changes according to the value of the advance angle and the value of the energization angle.

Since the switching elements 51a to 51f each repeat "ON" and "OFF" in the PWM-controlled state, the waveform is in fact a rectangular wave shape having projections and indentations. However, for convenience of illustration, in FIG. 4 and FIG. 6 (to be described later), the "ON/OFF" of each of the switching elements 51a to 51f is not specified, but is labeled as "PWM phase". Herein, in FIG. 4, the "PL" state is labeled as "PWM phase (MAX Duty)", the "PS" state is labeled as "PWM phase (MIN Duty)", and the "PM" state is labeled as "PWM phase (Duty=50)".

For example, in the stage 1 defined between the Hall edge HE1 and the Hall edge HE2, the energization pattern of the section A is a combination of the states of the switching elements 51a to 51f being "PL", "PL", "PS", "PS", "PM", and "PM", respectively. Further, the energization pattern of the section B is a combination of the states of the switching elements 51a to 51f being "PL", "PL", "PS", "PS", "PL", and "PL", respectively. Further, the energization pattern of the section C is a combination of the states of the switching elements 51a to 51f being "PM", "PM", "PS", "PS", "PL", and "PL", respectively.

Further, FIG. 5 is a table summarizing an example of the non-free energization patterns of the first method shown in FIG. 4. The ROM (not shown) in the control part 40 stores the non-free energization patterns in a format as shown in FIG. 5, for example. In FIG. 5, "PL" represents the fourth state in which PWM control is performed according to a PWM signal with the maximum duty ratio, "PS" represents the fifth state in which PWM control is performed according to a PWM signal with the minimum duty ratio, and "PM" represents the sixth state in which PWM control is performed according to a PWM signal with the intermediate duty ratio between the maximum duty ratio and the minimum duty ratio. Thus, in the non-free driving mode (first method), the driving control part 43 controls conduction (energization) of the switching elements 51a to 51f according to the non-free energization patterns above.

Second Method of Non-Free Energization

In the driving and energization based on the non-free energization pattern using the second method, the states (1) to (3) above are respectively changed to three states (7) to (9) below. In the state (1) and the state (7), since the control on each of the switching elements is the same, actually the state has not changed.

(7) Seventh state: The first state is maintained, and the switching element 51a to 51f is continuously turned on ("ON").

(8) Eighth state: The third state is changed to an eighth state (hereinafter referred to as a "P1" state) in which PWM control is performed according to a PWM signal with the instruction duty ratio inputted from outside.

(9) Ninth state: The second state is changed to a ninth state (hereinafter referred to as a "P2" state) in which PWM control is performed according to a PWM signal with a duty ratio that is one half of the instruction duty ratio inputted from outside.

In other words, the timings at which the U-phase, V-phase, and W-phase windings (21u, 21v, 21w) respectively become the P2 state (ninth state) in the non-free energization pattern are the same as the timings at which the U-phase, V-phase, and W-phase windings (21u, 21v, 21w) respectively become OFF-phase windings (second state) in the rectangular wave energization pattern.

Thus, it is possible to address the problem that the control circuit (control part 40) that drives the switching elements malfunctions when a negative voltage is generated at an input terminal of the motor 2 upon switching of the energization pattern from the first state to the second state. Further, even at the timing (phase open period: period of being in the second state) of being free in 120-degree rectangular wave energization, PWM control is performed as in the ninth state, which results in 180-degree energization and a smooth current waveform at the time of commutation, so it becomes possible to expect an effect of quieting a driving sound (reducing motor operation sound). In other words, similar effects can be expected using the driving and energization method according to the non-free energization pattern of either the first method or the second method.

Herein, in this embodiment, the duty ratio in the seventh state is 100%. For example, in the case where the instruction duty ratio is 80%, the duty ratio in the eighth state becomes 80%, and the duty ratio in the ninth state becomes 40% according to 80÷2. The instruction duty ratio is assumed to be stored in advance to the ROM (not shown) of the control part 40 by the user.

FIG. 6 is a diagram showing an example of the non-free energization patterns of the second method. FIG. 6 is a diagram showing the correspondence between the position detection signals (Hu, Hv, Hw) and the energization patterns of the respective switching elements 51a to 51f, with the horizontal axis representing the electrical angle.

The example of energization control shown in FIG. 6 is the case where the advance angle is 20 degrees and the energization angle is 130 degrees. The energization pattern is a combination of any of states of the respective switching elements 51a to 51f, including a state (seventh state) of maintaining the continuously on state ("ON"), i.e., "ON" (first state), a state changed from being continuously turned off ("OFF") (period other than "ON" or "PWM"), i.e., "OFF" (second state), to "P2" (ninth state), and a state changed from being controlled to be turned "on" or "off" at a specific cycle (PWM-controlled state) ("PWM"), i.e., "PWM" (third state), to "P1" (eighth state). Each of the stages 1 to 6 is further divided into three sections including a section A", a section B", and a section C". An energization pattern is set individually for each of the section A", the section B", and the section C". The period (electrical angle) of each of the section A", the section B", and the section C" changes according to the value of the advance angle and the value of the energization angle. Herein, in FIG. 6, the "P1" state is labeled as "PWM phase (Instruction Duty)", and the "P2" state is labeled as "PWM phase (½ Duty)".

For example, in the stage 1 defined between the Hall edge HE1 and the Hall edge HE2, the energization pattern of the section A" is a combination of the states of the switching elements 51a to 51f being "1", "0", "P1", "P1", "P2", and "P2", respectively. Further, the energization pattern of the section B" is a combination of the states of the switching elements 51a to 51f being "1", "0", "P1", "P1", "1", and "0", respectively. Further, the energization pattern of the section C" is a combination of the states of the switching elements 51a to 51f being "P2", "P2", "P1", 5 "P1", "1", and "0", respectively.

Further, FIG. 7 is a table summarizing an example of the non-free energization patterns of the second method shown in FIG. 6. The ROM (not shown) in the control part 40 stores the non-free energization patterns in a format as shown in FIG. 7, for example. In FIG. 7, "P1" represents the eighth state in which PWM control is performed according to a PWM signal with the instruction duty ratio inputted from outside, "P2" represents the ninth state in which PWM control is performed according to a PWM signal with a duty ratio that is one half of the instruction duty ratio, "1" represents "ON", and "0" represents "OFF". Thus, in the non-free driving mode (second method), the driving control part 43 controls conduction (energization) of the switching elements 51a to 51f according to the non-free energization patterns above.

As described above, the rectangular wave driving mode is a driving mode of the rectangular wave driving method and is a driving mode of an output higher than the non-free driving mode. Further, the non-free driving mode is a driving mode of the non-free driving method which outputs a driving signal of an intermediate power by PWM control for an open period of a non-energized phase among driving signal lines of a plurality of phases driving the motor 2, and the non-free driving mode is a driving mode of an output lower than the rectangular wave driving mode. Herein, the driving signal of the intermediate power is a PWM signal with an intermediate duty ratio between the PWM signal with the maximum duty ratio and the PWM signal with the minimum duty ratio (first method), or a PWM signal with a duty ratio that is one half of the instruction duty ratio inputted from outside (second method).

Figure 8:
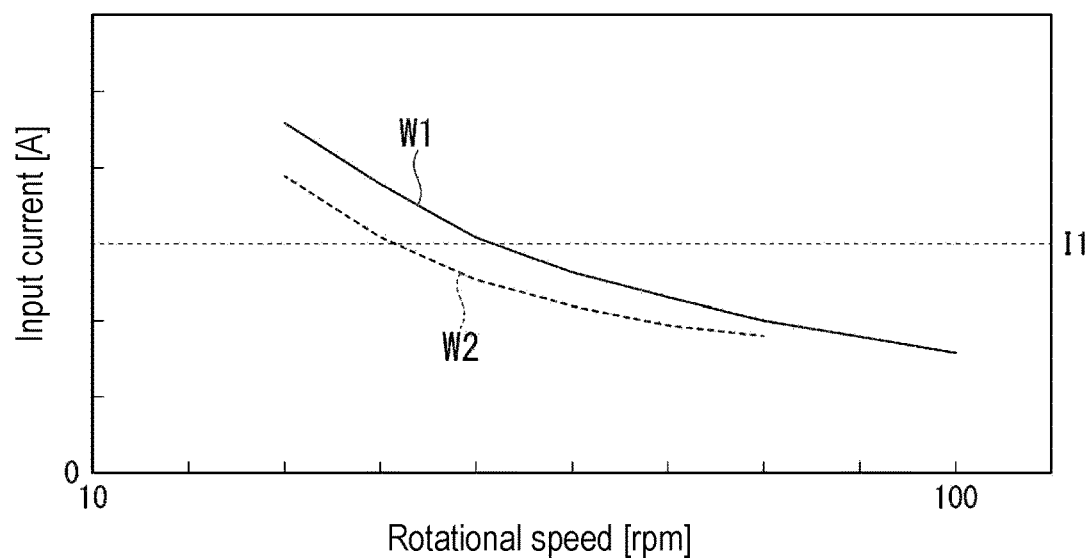
FIG. 8 is a diagram showing a difference in characteristics between rectangular wave driving and non-free driving in this embodiment.

Further, FIG. 8 is a diagram showing a difference in characteristics between rectangular wave driving and non-free driving in this embodiment. In FIG. 8, the vertical axis of the graph represents an input current [ampere (A)] of motor driving, and the horizontal axis represents a rotational speed (number of revolutions) [revolutions per minute (rpm)] of the motor 2. Further, a waveform W1 represents the characteristics of the rectangular wave driving mode, and a waveform W2 represents the characteristics of the non-free driving mode.

As shown in FIG. 8, at an input current I1, since the rectangular wave driving mode (waveform W1) is capable of outputting a rotational speed higher than the non-free driving mode (waveform W2), the rectangular wave driving mode is capable of obtaining a higher output compared to the non-free driving mode. Further, the non-free driving mode is capable of driving at a lower input current compared to the rectangular wave driving mode for outputting the same rotational speed.

Returning to the description of FIG. 1, the driving control part 43 performs control to switch between the non-free driving mode and the rectangular wave driving mode according to a driving load of the motor 2. For example, the driving control part 43 switches between the non-free driving mode and the rectangular wave driving mode based on an accumulated point value (load integrated value), which is an indicator of the driving load of the motor 2.

For example, in the case where the accumulated point value (load integrated value) is less than a predetermined threshold, the driving control part 43 switches to the non-free driving mode, and in the case where the accumulated point value (load integrated value) is equal to or greater than the threshold, the driving control part 43 switches to the rectangular wave driving mode of a high output.

The driving control part 43 may also switch between the non-free driving mode and the rectangular wave driving mode using a vehicle speed, which is a traveling speed of a vehicle equipped with the motor 2, in place of the accumulated point value (load integrated value). Herein, the vehicle speed is an index value associated with the motor load.

Further, the driving control part 43 controls an output duty ratio so as not to exceed a duty limit value (duty ratio upper limit value) set according to the rotational speed. Herein, the output duty ratio indicates a driving output of the motor 2. The duty limit value is set by the upper limit value setting part 44 (to be described later). Details of the duty limit value will be described later.

Further, the driving control part 43 controls conduction of the plurality of switching elements 51a to 51f of the inverter 50, which generates driving signals of three phases, by switching between the non-free driving mode and the rectangular wave driving mode. That is, the driving control part 43 drives the motor 2 by switching between the non-free driving mode and the rectangular wave driving mode according to the driving patterns above.

The upper limit value setting part 44 sets the duty limit value (duty ratio upper limit value). The upper limit value setting part 44 sets a different duty limit value (duty ratio upper limit value) depending on the rotational speed. As duty limit values, the upper limit value setting part 44, for example, sets a low rotation duty limit value (low rotation duty ratio upper limit value), a maximum duty limit value (maximum duty ratio upper limit value), and an upper limit value of a transition period from the low rotation duty limit value to the maximum duty limit value.

Herein, the low rotation duty limit value (low rotation duty ratio upper limit value) is a limit value that restricts the maximum value of the output duty ratio in a low rotation region in which the rotational speed is equal to or less than a predetermined rotation threshold. Further, the maximum duty limit value (maximum duty ratio upper limit value) is a limit value corresponding to the maximum output value of the driving output.

Further, when switching between the non-free driving mode and the rectangular wave driving mode, the upper limit value setting part 44 changes slope information indicating a change amount of the limit value (upper limit value) of the transition period with respect to the change in the rotational speed according to the driving mode. The slope information of the non-free driving mode is set to be larger than the slope information of the rectangular wave driving mode. When switching between the non-free driving mode and the rectangular wave driving mode, the upper limit value setting part 44 changes the slope information and changes the limit value (upper limit value) of the transition period based on the changed slope information. Herein, referring to FIG. 9, details of the duty limit value will be described.

Figure 9:
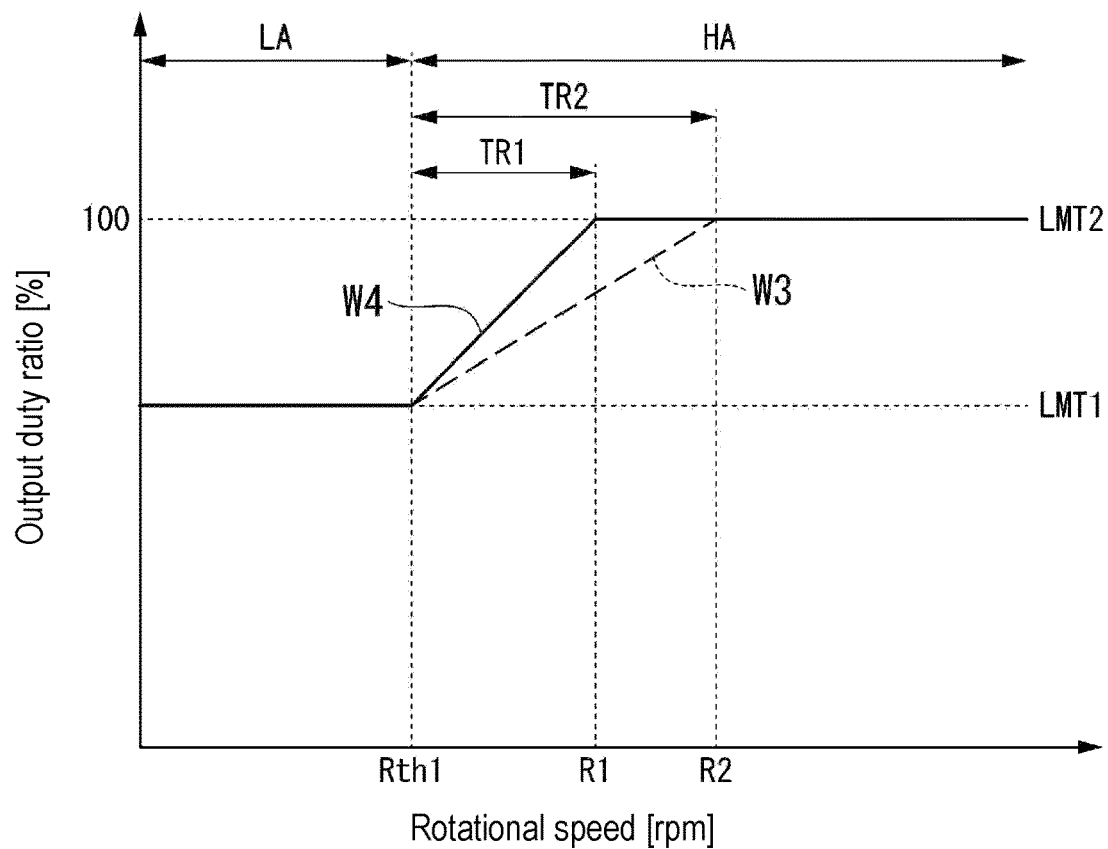
FIG. 9 is a diagram showing an example of a duty limit value of the motor control device in this embodiment.

FIG. 9 is a diagram showing an example of the duty limit value of the motor control device in this embodiment. In FIG. 9, the vertical axis of the graph represents an output duty ratio [%], and the horizontal axis represents a rotational speed (number of revolutions) [rpm]. Further, a waveform W3 represents a waveform of a duty limit value for the rectangular wave driving mode, and a waveform W4 represents a waveform of a duty limit value for the non-free driving mode.

Further, in FIG. 9, a low rotation region LA is a region in which the rotational speed is equal to or less than a rotation threshold Rth1, and a high rotation region HA is a region in which the rotational speed exceeds the rotation threshold Rth1. Further, a transition period TR1 is a transition period from a low rotation duty limit value LMT1 (rotation threshold Rth1) in the non-free driving mode to a maximum duty limit value LMT2 (rotational speed R1). Further, a transition period TR2 is a transition period from the low rotation duty limit value LMT1 (rotation threshold Rth1) in the rectangular wave driving mode to the maximum duty limit value LMT2 (rotational speed R2).

As shown in FIG. 9, in the low rotation region LA, the upper limit value setting part 44 sets the duty limit value to the low rotation duty limit value LMT1. Further, in the transition period TR1 of the non-free driving mode, the upper limit value setting part 44 sets the duty limit value based on the slope information for the non-free driving mode, as indicated by the waveform W4. Further, in the transition period TR2 of the rectangular wave driving mode, the upper limit value setting part 44 sets the duty limit value based on the slope information for the rectangular wave driving mode, as indicated by the waveform W3.

Further, the upper limit value setting part 44 sets the duty limit value to the maximum duty limit value LMT2 after the transition period of the high rotation region HA. In this embodiment, the maximum duty limit value LMT2 is a duty ratio of 100%.

In this manner, the upper limit value setting part 44 sets different slope information depending on the driving mode and sets the duty limit value of the transition period based on the set slope information. The upper limit value setting part 44 stores the setting of the duty limit value to a storage part (not shown) included in the control part 40.

Figure 10:
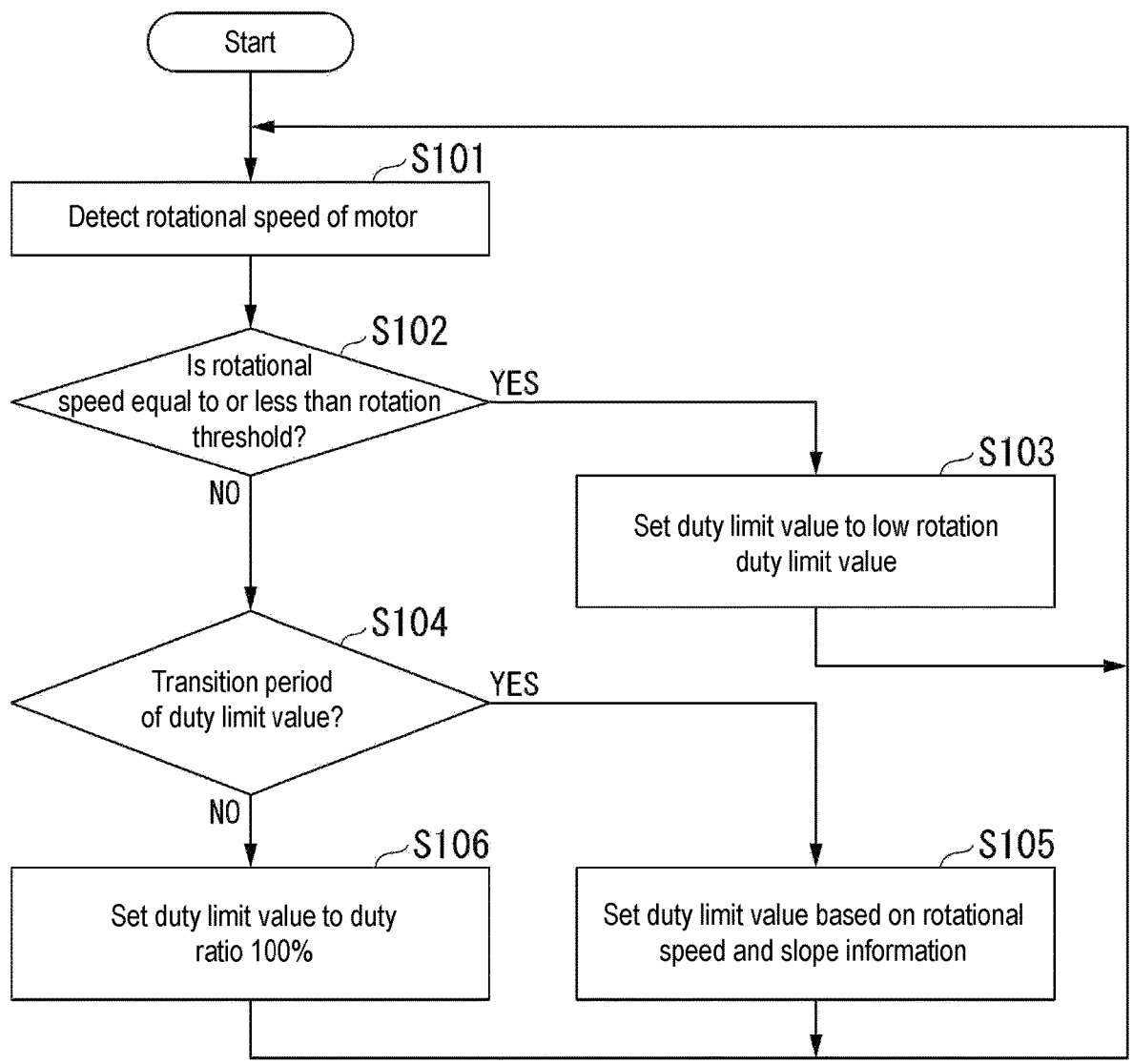
FIG. 10 is a flowchart showing an example of a setting process of the duty limit value of the motor control device according to this embodiment.

Next, referring to the drawings, an operation of the motor control device 150 according to this embodiment will be described. FIG. 10 is a flowchart showing an example of a setting process of the duty limit value of the motor control device 150 according to this embodiment.

As shown in FIG. 10, first, the control part 40 of the motor control device 150 detects a rotational speed of the motor (step S101). The rotational speed detection part 41 of the control part 40 detects the rotational speed based on position detection signals (Hu, Hv, Hw) outputted by the position detection part 30.

Next, the control part 40 determines whether the rotational speed is equal to or less than a rotation threshold Rth1 (step S102). In the case where the rotational speed is equal to or less than the rotation threshold Rth1 (step S102: YES), the upper limit value setting part 44 of the control part 40 proceeds to step S103. In the case where the rotational speed is greater (faster) than the rotation threshold Rth1 (step S102: NO), the upper limit value setting part 44 proceeds to step S104.

In step S103, the upper limit value setting part 44 sets a duty limit value to a low rotation duty limit value LMT1 (refer to FIG. 9). After the process of step S103, the upper limit value setting part 44 returns the process to step S101.

Further, in step S104, the upper limit value setting part 44 determines whether it is a transition period of the duty limit value. The upper limit value setting part 44 determines whether it is a transition period of the duty limit value based on the rotational speed and the driving mode. In the case where it is the transition period of the duty limit value (step S104: YES), the upper limit value setting part 44 proceeds to step S105. In the case where it is not the transition period of the duty limit value (step S104: NO), the upper limit value setting part 44 proceeds to step S106.

In step S105, the upper limit value setting part 44 sets the duty limit value based on the rotational speed and the slope information. The upper limit value setting part 44 sets the duty limit value in the transition period based on the rotational speed and the slope information corresponding to the driving mode. The detailed process in step S105 will be described later with reference to FIG. 11. After the process of step S105, the upper limit value setting part 44 returns the process to step S101.

In step S106, the upper limit value setting part 44 sets the duty limit value to a duty ratio 100% (maximum duty limit value LMT2 in FIG. 9). After the process of step S106, the upper limit value setting part 44 returns the process to step S101.

Figure 11:
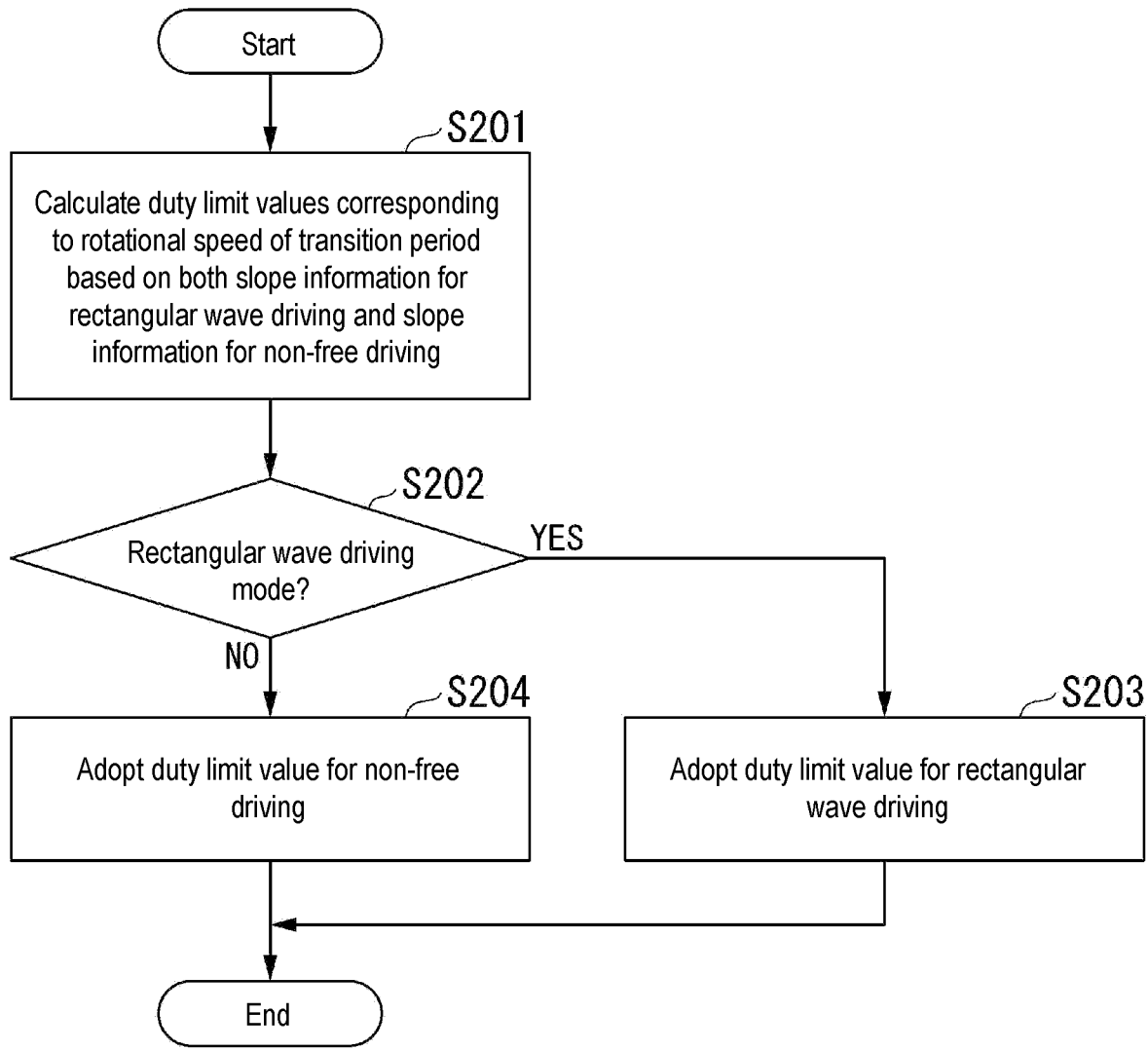
FIG. 11 is a flowchart showing an example of a setting process of the duty limit value according to a driving mode in a transition period of the motor control device according to this embodiment.

Next, referring to FIG. 11, details of the process of step S105 in FIG. 10 will be described. FIG. 11 is a flowchart showing an example of a setting process of the duty limit value according to the driving mode in the transition period of the motor control device 150 according to this embodiment.

As shown in FIG. 11, first, the upper limit value setting part 44 calculates duty limit values corresponding to the rotational speed of the transition period based on both the slope information for rectangular wave driving and the slope information for non-free driving (step S201). That is, the upper limit value setting part 44 generates the duty limit value corresponding to the rotational speed for both rectangular wave driving and non-free driving.

Next, the upper limit value setting part 44 determines whether the current driving mode is the rectangular wave driving mode (step S202). In the case where the current driving mode is the rectangular wave driving mode (step S202: YES), the upper limit value setting part 44 proceeds to step S203. In the case where the current driving mode is not the rectangular wave driving mode (i.e., it is the non-free driving mode) (step S202: NO), the upper limit value setting part 44 proceeds to step S204.

In step S203, the upper limit value setting part 44 adopts the duty limit value for rectangular wave driving. That is, the upper limit value setting part 44 sets the duty limit value for rectangular wave driving, which is generated according to the slope information for rectangular wave driving, as the duty limit value. After the process of step S203, the upper limit value setting part 44 ends the setting process in the transition period (returning to the process in FIG. 10).

In step S204, the upper limit value setting part 44 adopts the duty limit value for non-free driving. That is, the upper limit value setting part 44 sets the duty limit value for non-free driving, which is generated according to the slope information for non-free driving, as the duty limit value. After the process of step S204, the upper limit value setting part 44 ends the setting process in the transition period (returning to the process in FIG. 10).

Figure 12:
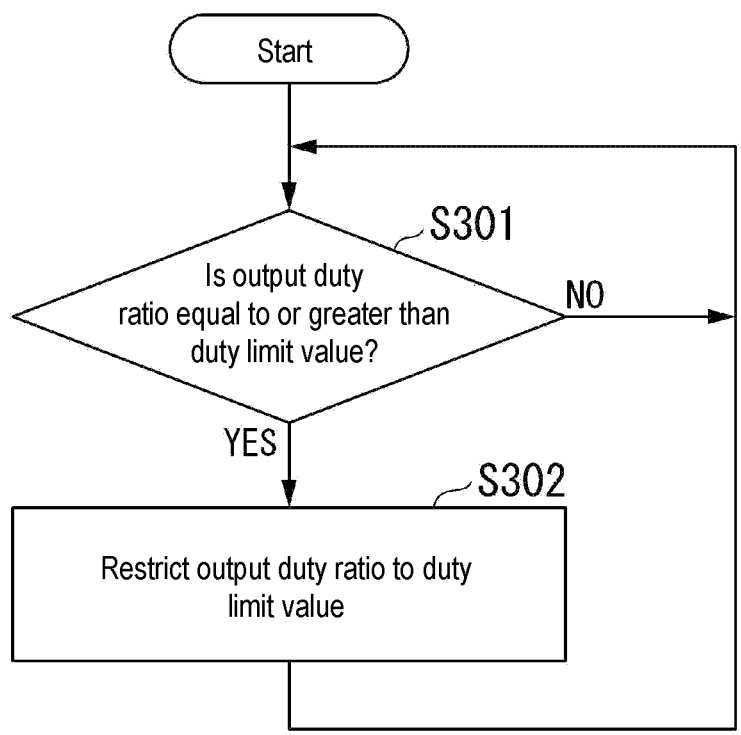
FIG. 12 is a flowchart showing an example of an output restriction process of the motor control device according to this embodiment.

Next, referring to FIG. 12, an output restriction process of the motor control device 150 according to this embodiment will be described. FIG. 12 is a flowchart showing an example of the output restriction process of the motor control device 150 according to this embodiment.

As shown in FIG. 12, first, the driving control part 43 of the control part 40 determines whether an output duty ratio is equal to or greater than the duty limit value (step S301). The driving control part 43 determines whether the output duty ratio is equal to or greater than the duty limit value set according to FIG. 10. In the case where the output duty ratio is equal to or greater than the duty limit value (step S301: YES), the driving control part 43 proceeds to step S302. In the case where the output duty ratio is less than the duty limit value (step S301: NO), the driving control part 43 returns the process to step S301.

In step S302, the driving control part 43 restricts the output duty ratio to the duty limit value. That is, the driving control part 43 sets the output duty ratio to the duty limit value to restrict the output duty ratio so as not to exceed the duty limit value. After the process of step S302, the driving control part 43 returns the process to step S301.

Figure 13:
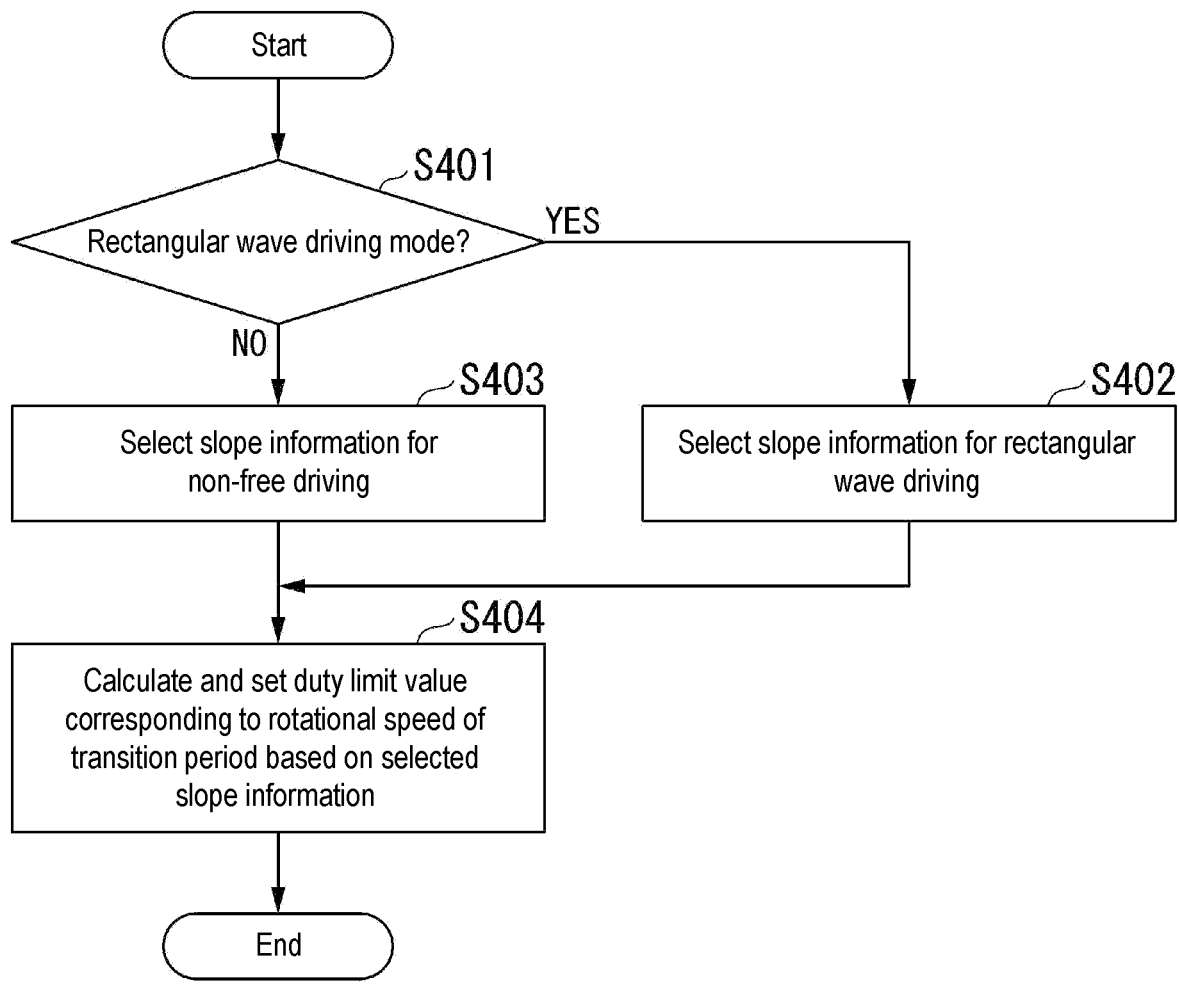
FIG. 13 is a flowchart showing a first modification example of the setting process of the duty limit value according to the driving mode in the transition period of the motor control device according to this embodiment.

Next, referring to FIG. 13 and FIG. 14, modification examples of the setting process of the duty limit value according to the driving mode in the transition period will be described. FIG. 13 is a flowchart showing a first modification example of the setting process of the duty limit value according to the driving mode in the transition period of the motor control device 150 according to this embodiment.

In the first modification example, a modification example in which the duty limit value is calculated after selecting the slope information according to the driving mode will be described. As shown in FIG. 13, first, the upper limit value setting part 44 determines whether the current driving mode is the rectangular wave driving mode (step S401). In the case where the current driving mode is the rectangular wave driving mode (step S401: YES), the upper limit value setting part 44 proceeds to step S402. In the case where the current driving mode is not the rectangular wave driving mode (i.e., it is the non-free driving mode) (step S401: NO), the upper limit value setting part 44 proceeds to step S403.

In step S402, the upper limit value setting part 44 selects the slope information for rectangular wave driving. The upper limit value setting part 44 acquires the slope information for rectangular wave driving stored in advance in the storage part (not shown). After the process of step S402, the upper limit value setting part 44 proceeds to step S404.

In step S403, the upper limit value setting part 44 selects the slope information for non-free driving. The upper limit value setting part 44 acquires the slope information for non-free driving stored in advance in the storage part (not shown). After the process of step S403, the upper limit value setting part 44 proceeds to step S404.

In step S404, the upper limit value setting part 44 calculates and sets the duty limit value corresponding to the rotational speed of the transition period based on the selected slope information. The upper limit value setting part 44 sets the duty limit value generated based on the slope information selected according to the driving mode. After the process of step S404, the upper limit value setting part 44 ends the setting process in the transition period (returning to the process in FIG. 10).

Figure 14:
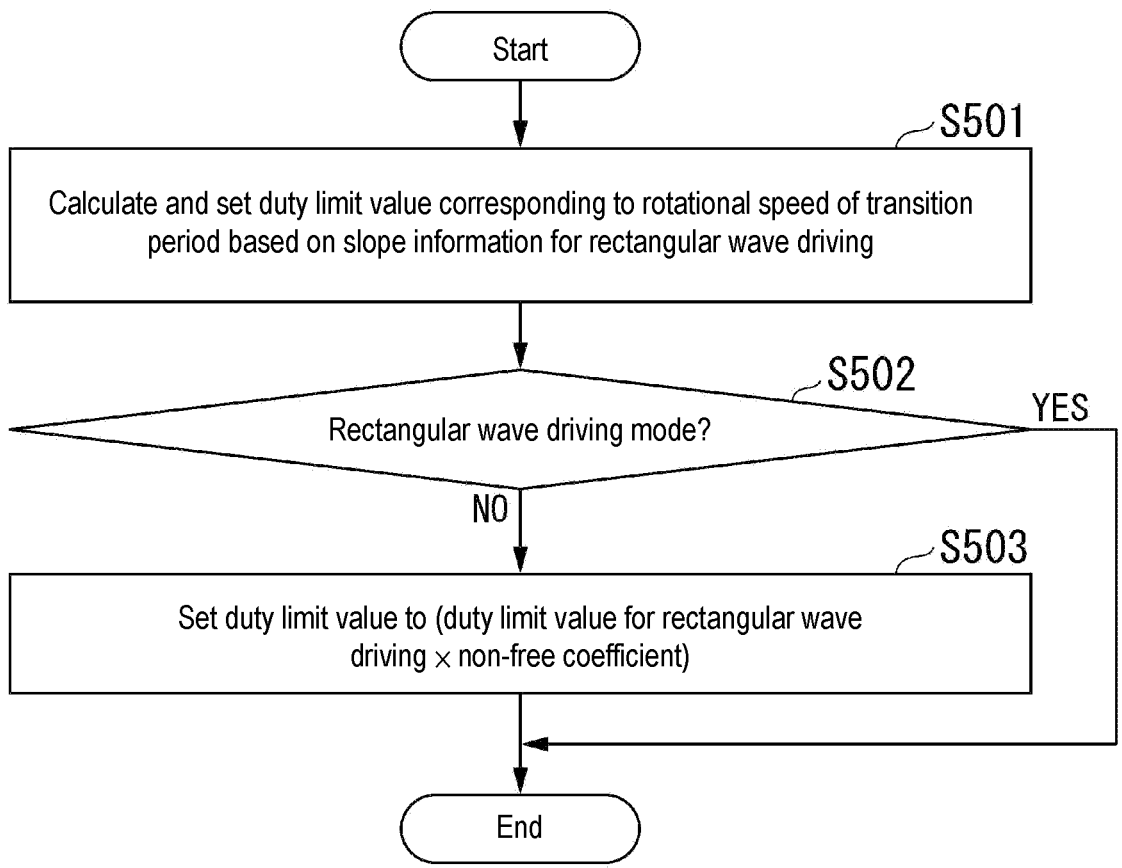
FIG. 14 is a flowchart showing a second modification example of the setting process of the duty limit value according to the driving mode in the transition period of the motor control device according to this embodiment.

Further, FIG. 14 is a flowchart showing a second modification example of the setting process of the duty limit value according to the driving mode in the transition period of the motor control device 150 according to this embodiment.

The second modification example describes a modification example in which the duty limit value is calculated based on the slope information of one of the rectangular wave driving mode and the non-free driving mode, and a coefficient is integrated with the duty limit value in the case of the other of the rectangular wave driving mode and the non-free driving mode.

As shown in FIG. 14, first, the upper limit value setting part 44 calculates and sets the duty limit value corresponding to the rotational speed of the transition period based on the slope information for rectangular wave driving (step S501). The upper limit value setting part 44 temporarily sets the duty limit value for rectangular wave driving as the duty limit value.

Next, the upper limit value setting part 44 determines whether the current driving mode is the rectangular wave driving mode (step S502). In the case where the current driving mode is the rectangular wave driving mode (step S502: YES), the upper limit value setting part 44 ends the setting process in the transition period (returning to the process in FIG. 10). In the case where the current driving mode is not the rectangular wave driving mode (i.e., it is the non-free driving mode) (step S502: NO), the upper limit value setting part 44 proceeds to step S503.

In step S503, the upper limit value setting part 44 sets the duty limit value as (duty limit value for rectangular wave driving x non-free coefficient). The upper limit value setting part 44 integrates the non-free coefficient (coefficient information for non-free driving), which is predetermined coefficient information, with the duty limit value for rectangular wave driving to generate the duty limit value for non-free driving, and sets the duty limit value for non-free driving as the duty limit value. After the process of step S503, the upper limit value setting part 44 ends the setting process in the transition period (returning to the process in FIG. 10).

The example above has described that the upper limit value setting part 44 integrates the non-free coefficient (coefficient information for non-free driving), which is predetermined coefficient information, with the duty limit value for rectangular wave driving to generate the duty limit value for non-free driving, but the embodiment is not limited thereto. For example, the upper limit value setting part 44 may also integrate a rectangular wave coefficient (coefficient information for rectangular wave driving), which is predetermined coefficient information, with the duty limit value for non-free driving to generate the duty limit value for rectangular wave driving.

Figure 15:
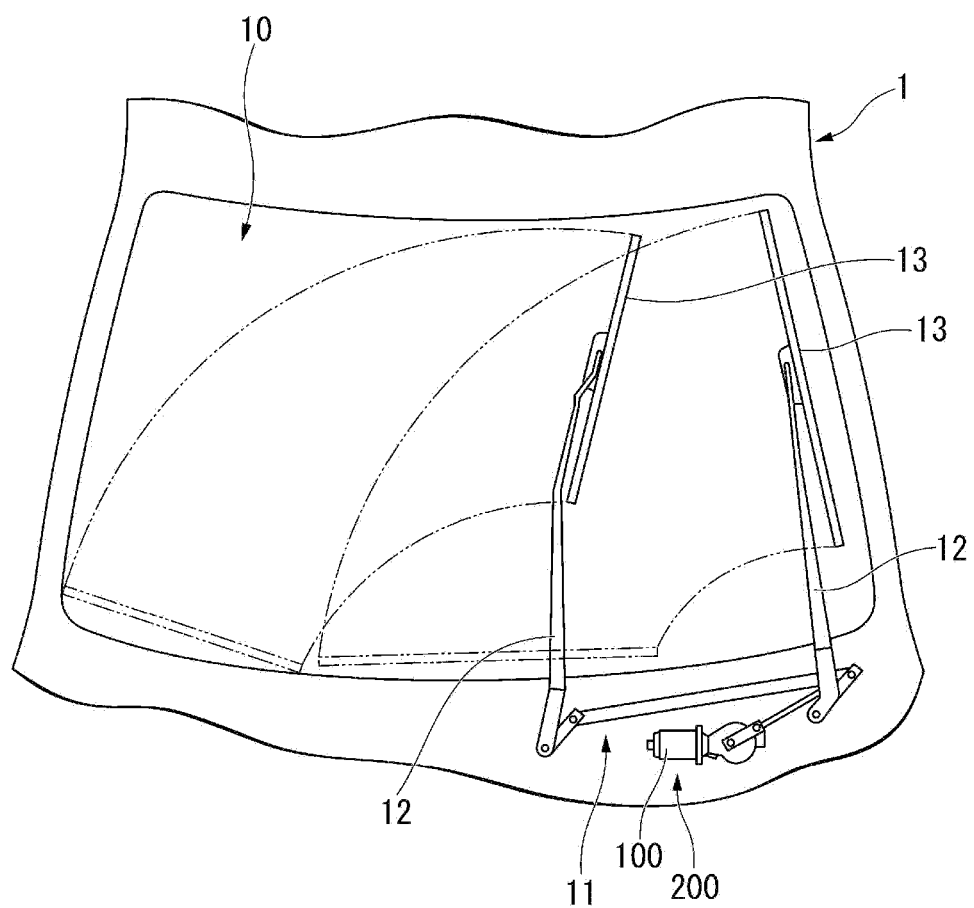
FIG. 15 is a configuration view showing an example of a wiper device according to this embodiment.

Next, referring to FIG. 15, an example of a case of applying the motor device 100 above to a wiper device will be described. FIG. 15 is a configuration view showing an example of a wiper device 200 according to this embodiment.

As shown in FIG. 15, the wiper device 200 performs a wiping operation on a window surface of a window glass 10 of a vehicle 1. The wiper device 200 includes a motor device 100, a link mechanism 11, two wiper arms 12, and wiper blades 13 mounted at tips of the respective wiper arms 12.

The motor device shown in FIG. 15 is the motor device 100 of this embodiment as described above, and detailed descriptions thereof will be omitted herein. The motor device 100 includes a motor 2 and a motor control device 150.

The wiper arm 12 operates on the window surface of the window glass 10 by the rotational driving of the motor device 100 and performs the wiping operation with the wiper blade 13 mounted at the tip. The two wiper arms 12 are connected by the link mechanism 11.

The wiper blade 13 is provided to be pressed against the window glass 10 by the wiper arm 12. The wiper blade 13 includes a blade rubber (not shown) that is held by a blade holder mounted at the tip of the wiper arm 12. Upon swinging of the wiper arm 12 by the motor device 100, the wiper blade 13 reciprocates over a wiping range on the outer surface of the window glass 10 and wipes the window glass 10 with the blade rubber (not shown).

As described above, a motor control device 150 according to this embodiment is a motor control device which controls a motor 2 having a rotor shaft 22a (output shaft) and includes a driving control part 43 and an upper limit value setting part 44. The driving control part 43 controls motor driving by switching between a non-free driving mode (first driving mode) which drives the motor 2 and a rectangular wave driving mode (second driving mode), and controls an output duty ratio indicating a driving output of the motor 2 so as not to exceed a duty limit value (duty ratio upper limit value). Herein, the rectangular wave driving mode (second driving mode) is a high-output driving mode in which a number of revolutions of the rotor shaft 22a and an output of the motor 2 are higher than in the non-free driving mode. The upper limit value setting part 44 sets, as the duty limit value, a low rotation duty limit value (low rotation duty ratio upper limit value), a maximum duty limit value (maximum duty ratio upper limit value), and a limit value (upper limit value) of a transition period from the low rotation duty limit value to the maximum duty limit value in a high rotation region exceeding a rotation threshold. The low rotation duty limit value is a limit value (upper limit value) that restricts a maximum value of the output duty ratio in a low rotation region in which a rotational speed is equal to or less than a predetermined rotation threshold. The maximum duty limit value is a limit value (upper limit value) corresponding to a maximum output value of the driving output, and is, for example, a duty ratio of 100%. The upper limit value setting part 44 changes slope information indicating a change amount in the upper limit value of the transition period with respect to a change in the rotational speed according to the driving mode when switching between the non-free driving mode and the rectangular wave driving mode.

Thus, by changing the slope information of the duty limit value according to the driving mode, the motor control device 150 according to this embodiment can set an appropriate duty limit value (duty ratio upper limit value) according to the driving mode. Further, the motor control device 150 according to this embodiment can suppress an overcurrent due to a load according to the duty limit value (duty ratio upper limit value). Accordingly, the motor control device 150 according to this embodiment can obtain sufficient output performance according to the driving mode while safely protecting the motor device 100.

In the motor control device 150 according to this embodiment, for example, as shown in FIG. 9, since the slope information of the duty limit value is changed between the rectangular wave driving mode (waveform W3) and the non-free driving mode (waveform W4), it is possible to maintain a 100% duty ratio (maximum duty limit value) until a low rotational speed in the non-free driving mode of a low output compared to the rectangular wave driving mode of a high output.

Further, in this embodiment, the slope information of the non-free driving mode is set to be larger than the slope information of the rectangular wave driving mode. The upper limit value setting part 44 changes the slope information when switching between the non-free driving mode and the rectangular wave driving mode, and changes the limit value (upper limit value) of the transition period based on the changed slope information.

Thus, the motor control device 150 according to this embodiment can maintain the motor until low rotation in the non-free driving mode at low power consumption (low current consumption) (refer to FIG. 9 above). For example, the motor control device 150 can reduce stoppage of the motor 2 due to a load or the like.

In this embodiment, the low rotation duty limit value and the maximum duty limit value are set to common limit values in the non-free driving mode and the rectangular wave driving mode. Thus, since the motor control device 150 according to this embodiment has the same winding resistance in the two driving modes, a lock current when the motor 2 is locked can protect the motor 2 with the common value.

Further, in this embodiment, the second driving mode is a driving mode of a rectangular wave driving method (rectangular wave driving mode), and the first driving mode is a driving mode of a non-free driving method (non-free driving mode). The driving mode of the non-free driving method (non-free driving mode) is a mode that outputs a driving signal of an intermediate power by PWM control for an open period (free period) of a non-energized phase among driving signal lines of a plurality of phases driving the motor 2.

Thus, the motor control device 150 according to this embodiment can appropriately switch between the non-free driving mode with low driving sound and the rectangular wave driving mode with a high output to drive the motor, and can obtain sufficient output performance according to the driving mode.

Further, in this embodiment, the driving signal of the intermediate power is a PWM signal with an intermediate duty ratio between a PWM signal with a maximum duty ratio and a PWM signal with a minimum duty ratio (first method), or is a PWM signal with a duty ratio that is one half of an instruction duty ratio inputted from outside (second method). Thus, the motor control device 150 according to this embodiment can appropriately perform motor driving by the non-free driving mode.

Further, in this embodiment, the motor 2 is a brushless motor having windings ($21u$, $21v$, $21w$) of three phases. The driving control part 43 controls conduction of a plurality of switching elements $51a$ to $51f$ included in an inverter 50, which generates driving signals of three phases, by switching between the non-free driving mode (first driving mode) and the rectangular wave driving mode (second driving mode). Thus, the motor control device 150 according to this embodiment can perform more appropriate motor driving on the brushless motor.

Further, in this embodiment, the upper limit value setting part 44 may generate the duty limit value using the slope information of one driving mode of the non-free driving mode and the rectangular wave driving mode in the transition period, and in the case of being in the other driving mode of the non-free driving mode and the rectangular wave driving mode, the upper limit value setting part 44 may integrate coefficient information with the duty limit value generated using the slope information of the one driving mode to generate the duty limit value of the other driving mode.

Thus, the motor control device 150 according to this embodiment can appropriately switch between the non-free driving mode and the rectangular wave driving mode to perform motor driving using only the slope information of one driving mode.

Further, a motor device 100 according to this embodiment includes the motor 2 and the motor control device 150 described above. Thus, the motor device 100 according to this embodiment achieves the same effects as the motor control device 150, and can obtain sufficient output performance according to the driving mode while safely protecting the motor device 100.

Further, a wiper device 200 according to this embodiment includes the motor 2 and the motor control device 150 described above. The motor control device 150 causes a wiper member (wiper arm 12 and wiper blade 13) to perform a wiping operation on a window surface using the motor 2.

Thus, the wiper device 200 according to this embodiment achieves the same effects as the motor device 100 described above, and can obtain sufficient output performance according to the driving mode while safely protecting the motor device 100.

Further, a motor control method according to this embodiment is a motor control method which controls a motor 2 having a rotor shaft 22a and includes a driving control step and an upper limit value setting step. In the driving control step, a driving control part 43 controls motor driving by switching between a non-free driving mode, which drives the motor 2, and a rectangular wave driving mode, which is a high-output driving mode in which a minimum rotational speed at which the rotor shaft 22a can be rotationally driven by an inputted power is higher than that in the non-free driving mode, and controls an output duty ratio indicating a driving output of the motor 2 so as not to exceed a duty limit value. In the upper limit value setting step, the upper limit value setting part 44 sets, as the duty limit value, a low rotation duty limit value which restricts a maximum value of the output duty ratio in a low rotation region in which the rotational speed is equal to or less than a predetermined rotation threshold, a maximum duty limit value corresponding to a maximum output value of the driving output, and an upper limit value of a transition period from the low rotation duty limit value to the maximum duty limit value in a high rotation region exceeding the rotation threshold, and changes slope information indicating a change amount in the upper limit value of the transition period with respect to a change in the rotational speed according to the driving mode when switching between the non-free driving mode and the rectangular wave driving mode.

Thus, the motor control method according to this embodiment achieves the same effects as the motor device 100 described above, and can obtain sufficient output performance according to the driving mode while safely protecting the motor device 100.

In addition, the disclosure is not limited to the embodiments above and may be modified within a scope without departing from the spirit of the disclosure. For example, the embodiments above have described an example of switching between the non-free driving mode (first driving mode) and the rectangular wave driving mode (second driving mode), but the disclosure is not limited thereto, and other driving modes may also be switched.

Further, the embodiments above have described an example in which the motor device 100 is used in the wiper device 200, but the disclosure is not limited thereto, and the motor device 100 may also be used for other purposes.

Further, in the embodiments above, non-free driving may use a sinusoidal driving or an energization waveform superimposed with a harmonic.

In addition, each configuration included in the motor device 100 described above has a computer system therein. Then, a program for realizing the function of each configuration included in the motor device 100 described above may be recorded on a computer-readable recording medium, and by loading and executing the program recorded on this recording medium into the computer system, the process of each configuration included in the motor device 100 described above may be performed. Herein, "loading and executing a program recorded on a recording medium into a computer system" includes installing the program into the computer system. The term "computer system" as used herein includes an OS and hardware such as peripheral devices. Further, the "computer system" may include a plurality of computer devices connected via a network including a communication line such as the Internet, a WAN, a LAN, and a dedicated line. The "computer-readable recording medium" refers to a portable medium such as a flexible disk, a magneto-optical disk, a ROM, and a CD-ROM, or a storage device such as a hard disk built in a computer system. As described above, the recording medium on which the program is stored may also be a non-transitory recording medium such as a CD-ROM.

Further, a part or all of the above functions may be realized as an integrated circuit such as a large scale integration (LSI). Each of the above functions may be individually configured into a processor, or a part or all of them may be integrated and configured into a processor. Further, the method of configuration into an integrated circuit is not limited to the LSI, but may also be realized by a dedicated circuit or a general-purpose processor. Further, when an integrated circuit configuration technology which replaces the LSI appears due to advances in semiconductor technology, an integrated circuit based on this technology may be used.

What is claimed is:

1. A motor control device which controls a motor having an output shaft, the motor control device comprising:
   a driving control part that controls motor driving by switching between a first driving mode which drives the motor and a second driving mode in which a number of revolutions of the output shaft and an output of the motor are higher than in the first driving mode, and controls an output duty ratio indicating a driving output of the motor so as not to exceed a duty ratio upper limit value; and
   an upper limit value setting part that sets, as the duty ratio upper limit value, a low rotation duty ratio upper limit value which restricts a maximum value of the output duty ratio in a low rotation region in which a rotational speed is equal to or less than a predetermined rotation threshold, a maximum duty ratio upper limit value corresponding to a maximum output value of the driving output, and an upper limit value of a transition period from the low rotation duty ratio upper limit value to the maximum duty ratio upper limit value in a high rotation region exceeding the rotation threshold, and changes slope information indicating a change amount in the upper limit value of the transition period with respect to a change in the rotational speed according to a driving mode when switching between the first driving mode and the second driving mode.

2. The motor control device according to claim 1, wherein the slope information of the first driving mode is set to be larger than the slope information of the second driving mode, and
the upper limit value setting part changes the slope information when switching between the first driving mode and the second driving mode, and changes the upper limit value of the transition period based on the changed slope information.

3. The motor control device according to claim 1, wherein the maximum duty ratio upper limit value is a duty ratio of 100%.

4. The motor control device according to claim 1, wherein the second driving mode is a driving mode of a rectangular wave driving method, and
the first driving mode is a driving mode of a non-free driving method that outputs a driving signal of an intermediate power by pulse width modulation control for an open period of a non-energized phase among driving signal lines of a plurality of phases driving the motor.

5. The motor control device according to claim 4, wherein the driving signal of the intermediate power is a pulse width modulation signal with an intermediate duty ratio between a pulse width modulation signal with a maximum duty ratio and a pulse width modulation signal with a minimum duty ratio, or is a pulse width modulation signal with a duty ratio that is one half of an instruction duty ratio inputted from outside.

6. The motor control device according to claim 1, wherein the motor is a brushless motor having windings of three phases, and
the driving control part controls conduction of a plurality of switching elements included in an inverter, which generates driving signals of three phases, by switching between the first driving mode and the second driving mode.

7. A motor device comprising:
the motor control device according to claim 1; and
the motor.

8. A wiper device comprising:
the motor control device according to claim 1; and
the motor, wherein
the motor control device causes a wiper member to perform a wiping operation on a window surface using the motor.

9. A motor control method which controls a motor having an output shaft, the motor control method comprising:
a driving control step in which a driving control part controls motor driving by switching between a first driving mode which drives the motor and a second driving mode in which a number of revolutions of the output shaft and an output of the motor are higher than in the first driving mode, and controls an output duty ratio indicating a driving output of the motor so as not to exceed a duty ratio upper limit value; and
an upper limit value setting step in which an upper limit value setting part sets, as the duty ratio upper limit value, a low rotation duty ratio upper limit value which restricts a maximum value of the output duty ratio in a low rotation region in which a rotational speed is equal to or less than a predetermined rotation threshold, a maximum duty ratio upper limit value corresponding to a maximum output value of the driving output, and an upper limit value of a transition period from the low rotation duty ratio upper limit value to the maximum duty ratio upper limit value in a high rotation region exceeding the rotation threshold, and changes slope information indicating a change amount in the upper limit value of the transition period with respect to a change in the rotational speed according to a driving mode when switching between the first driving mode and the second driving mode.

* * * * *